3,165,476
METHOD OF PROCESSING ELECTROLUMINESCENT PHOSPHOR

Anselm Wachtel, Sayreville, N.J., assignor to Westinghouse Electric Corporation, East Pittsburgh, Pa., a corporation of Pennsylvania
No Drawing. Filed Jan. 15, 1962, Ser. No. 166,356
4 Claims. (Cl. 252—301.6)

This invention relates to electroluminescence and, more particularly, to a method for processing electroluminescent phosphor.

Electroluminescent phosphors are now well known. Such phosphors when placed within the influence of an alternating electric field are responsive to product light. The most usual electroluminous phosphors are copper-activated zinc sulfide types. A portion of the zinc sulfide matrix for the phosphor can be replaced by other Group IIB metal sulfides and such phosphors are disclosed in copending application, S.N. 82,117, filed January 11, 1961, now Patent No. 3,039,972, and owned by the present assignee. Additional activators can be used to supplement the primary copper activator, in order to change the emission color of electroluminescence, and an example of such an additional activator is manganese.

When processing copper-activated metal sulfide electroluminescent phosphors, it is necessary to place into the phosphor raw mix an excess of copper over that which is ultimately retained in the phosphor. Apparently a portion of this excess copper forms cuprous sulfide segregations on and within the phosphor crystals in order to generate the intense electric fields which are believed to be required for good electroluminescent response. When such an excess of copper is placed into the raw mix, and the raw mix is fired to prepare the phosphor, the resulting fired material, while electroluminescent, has a dark body color due to excess cuprous sulfide. This acts to absorb the generated light. In addition, cuprous sulfide has a relatively low electrical resistance and tends to shunt the applied electric field, thereby impairing the electroluminescent performance of the phosphor.

In order to remove this excess cuprous sulfide, it has been the practice of the prior art to wash the fired phosphor in a solution which is a good solvent for cuprous sulfide, but which is not a good solvent for Group IIB metal sulfides. Examples of such washing solutions are an alkaline solution of cyanide salt, such as sodium cyanide, or an acid solution of a thiosulfate or thiourea. While the resulting phosphors which have been processed with such a washing procedure are very good with respect to electroluminescent performance, it would be desirable to improve still more the brightness or efficiency, or both, of such phosphors.

It is the general object of this invention to provide an improved method for processing fired, finely divided, copper-activated Group IIB metal sulfide electroluminescent phosphor in order to improve the brightness of the phosphor.

It is another object to provide an improved method for processing electroluminescent phosphor in order to improve the efficiency of the phosphor.

It is a further object to provide an electroluminescent phosphor having improved performance characteristics and which phosphor has been processed by an improved method.

The aforesaid objects of the invention, and other objects which will become apparent as the description proceeds, are achieved by first washing fired, finely divided, copper-activated Group IIB metal sulfide electroluminescent phosphor in a solution which is a good solvent for cuprous sulfide but which is not a good solvent for Group IIB metal sulfide for a sufficient period of time to lighten the body color of the phosphor. Essentially this first washing step is known in the art and is required to remove the excess cuprous sulfide from the phosphor surfaces, as explained hereinbefore. The residual washing solution which may remain on the phosphor particles is then removed by water rinsing and, in accordance with the present inveniton, the phosphor is additionally washed in a 5% to 15%, by weight, hydrogen peroxide solution for a period of at least thirty minutes and not exceeding such time as will permit a substantial portion of the phosphor to dissolve in this washing solution.

As a specific example for initially preparing a copper-activated, zinc sulfide electroluminescent phosphor, 1,000 grams of zinc sulfide are mixed with 30 grams of elemental sulfur, 9.5 grams of copper acetate and 0.4 gram of ammonium chloride. This raw mix is fired at 950° C. in a partially closed container placed within a nitrogen protective atmosphere for a period of 100 minutes. Thereafter, the phosphor desirably is lightly crushed, 3 grams of sulfur are added to the crushed material and it is refired, as in the initial firing step. The fired phosphor is then crushed to the status of a fine powder which passes a 325 mesh sieve. The state of division of this finely divided phosphor is not critical and is subject to considerable variation.

The phosphor is thereafter washed in a solution which is a good solvent for cuprous sulfide, but which is not a good solvent for Group IIB metal sulfide, for a sufficient period of time to lighten the body color of the phosphor. As a specific example, the phosphor is washed in an aqueous solution of sodium cyanide rendered more strongly alkaline by the addition of a small amount of sodium hydroxide, in order to prevent the evolution of hydrogen cyanide. Such a solution desirably has a normality for the cyanide radical of at least about 0.4. By way of further detail, 20 grams of the specific, finely divided phosphor, as described hereinbefore, are placed into a solution containing 50 grams of sodium cyanide and 10 grams of sodium hydroxide, dissolved in 100 cc. of water. Preferably the solution is heated to its boiling point. The phosphor is stirred in this heated solution for a period of approximately one hour. This washing will dissolve the excess, dark cuprous sulfide on the surfaces of the phosphor, in order to lighten its body color.

The concentration of the cyanide washing solution can be varied considerably as can the washing time and a visual indication of a light body color will indicate that the phosphor has been washed adequately. Thereafter, residual cyanide washing solution is removed from the surface portions of the phosphor, such as by rinsing in water. Other washing solutions which serve a similar purpose can be substituted for the sodium cyanide, such as thiourea or thiosulfate, as specified in U.S. Patent No. 2,965,580, dated December 20, 1960.

In accordance with the present invention, the cyanide-washed phosphor is additionally washed in a 5% to 15% by weight hydrogen peroxide aqueous solution for a period of at least thirty minutes and not exceeding such time as will permit a substantial portion of the phosphor to dissolve. Some of the phosphor is dissolved by the washing solution, but this does not impair the electroluminescent performance of residual phosphor. It is commercially impractical, however, first to prepare a phosphor and then to dissolve an excessive portion of it. As a practical matter, the hydrogen peroxide wash should not be continued for such time as will dissolve more than about 10% of the phosphor, which is considered to be a substantial portion of the phosphor. The preferred hydrogen peroxide concentration is about 10% by weight and the preferred time is approximately two hours. Particularly if the washing solution concentration is toward the upper end of the range of hydrogen peroxide concentration, the washing time should not exceed about four hours.

As a specific example for washing phosphors with hydrogen in accordance with the present invention, 20 grams of the cyanide-washed and water-rinsed phosphor are placed into 100 cc. of a 10% by weight aqueous solution of hydrogen peroxide. The phosphor is stirred in this solution for a period of about two hours. Thereafter the washing solution is decanted, desirably the phosphor is water rinsed several times, and then rinsed with ethanol to facilitate drying. This specific washing treatment will dissolve about 1% by weight of the phosphor. If the phosphor batch being washed is relatively large, it is desirable to cool the washing solution to prevent an excessive temperature rise due to the exothermic reaction. A room temperature hydrogen peroxide washing solution is preferred.

Electroluminescent phosphor which has been processed in accordance with the present invention will normally display both an increased brightness and an increased efficiency. Brightness increases of up to 100% have been observed and efficiency increases of up to 50% have been obtained. Normally there is some increase both in brightness and efficiency, but in the case of zinc-cadmium-mercuric sulfide electroluminescent phosphors as described in the aforementioned copending application, S.N. 82,117, filed January 11, 1961, only efficiency increases of up to 18% have been obtained. In the following Table I are listed the improved electroluminescent performance characteristics which have been obtained with various electroluminescent phosphors.

*Table I*

| Phosphor | Brightness (Arbitrary Units) | | | | | | Peak Efficiencies at 500 c.p.s. (Arbitrary Units) | | |
|---|---|---|---|---|---|---|---|---|---|
| | 200 v. | | | 600 v. | | | Untreated | Treated | Ratio |
| | Untreated | Treated | Ratio | Untreated | Treated | Ratio | | | |
| Green-emitting ZnS:Cu, Cl | [1] 0.015 (2) | 0.03 | 2.0 | 10.0 | 14.2 | 1.42 | 8.7 | 12.5 | 1.43 |
| Blue-emitting ZnS:Cu, I | [1] 0.115 / [2] 0.30 | 0.135 / 0.37 | 1.17 / 1.23 | 3.1 / 3.0 | 3.2 / 3.4 | 1.03 / 1.13 | 1.0 | 1.4 | 1.40 |
| Yellow-emitting ZnS:Cu, Mn, Cl | [1] 0.035 / [2] 0.62 | 0.035 / 0.70 | 1.0 / 1.12 | 1.55 / 7.3 | 1.50 / 7.7 | 0.97 / 1.06 | 3.0 | 3.7 | 1.23 |

[1] Excitation at 400 c.p.s.
[2] Excitation at 500 c.p.s.

The mechanism by which the additional hydrogen peroxide wash acts to improve the brightness, or efficiency, or both, of the present phosphors is not clearly understood. Some of the metal sulfide matrix in the phosphor reacts with the hydrogen peroxide to form zinc sulfate for example, thus modifying the nature of the surfaces of the phosphor particles. It is not sure whether this is responsible for the increased electroluminescent performance. Whatever the explanation, the resulting phosphor has improved electroluminescent characteristics.

It will be recognized that the objects of the invention have been achieved by providing a method for improving the electroluminescent response characteristics of finely divided Group IIB metal sulfide electroluminescent phosphor which includes copper as activator. This method improves the brightness of the phosphor, or the efficiency, or both. There has also been provided an improved electroluminescent phosphor which has been processed by an improved method.

While best examples have been illustrated and described in detail, it is to be particularly understood that the invention is not limited thereto or thereby.

I claim as my invention:

1. The method of enhancing the electroluminescent performance of fired finely divided Group IIB metal sulfide electroluminescent phosphor which includes copper as activator, which method comprises, washing said phosphor in a solution which is a good solvent for cuprous sulfide but which is not a good solvent for Group IIB metal sulfide for a sufficient period of time to lighten the body color of said phosphor, removing residual washing solution from said phosphor, additionally washing said phosphor in a 5% to 15% by weight hydrogen peroxide aqueous solution for a period of at least thirty minutes and not exceeding such time as will permit a substantial portion of said phosphor to dissolve, and thereafter removing from said phosphor any residual hydrogen peroxide washing solution.

2. The method of enhancing the electroluminescent performance of fired finely divided copper-activated Group IIB metal sulfide electroluminescent phosphor, which method comprises, washing said phosphor in a solution which is a good solvent for cuprous sulfide but which it not a good solvent for Group IIB metal sulfide for a sufficient period of time to lighten the body color of said phosphor, removing residual washing solution from said phosphor, additionally washing said phosphor in a 5% to 15% by weight hydrogen peroxide aqueous solution maintained at about room temperature for a period of at least thirty minutes and not exceeding such time as will permit a substantial portion of said phosphor to dissolve, and thereafter removing from said phosphor any residual hydrogen peroxide washing solution.

3. The method of enhancing the electroluminescent performance of fired finely divided copper-activated zinc sulfide electroluminescent phosphor, which method comprises washing said phosphor in cyanide-radical-containing solution for a sufficient period of time to lighten the body color of said phosphor, removing residual washing solution from said phosphor, additionally washing said phosphor in a 5% to 15% by weight hydrogen peroxide aqueous solution for a period of at least thirty minutes and not exceeding such time as will permit a substantial portion of said phosphor to dissolve, and thereafter removing from said phosphor any residual hydrogen peroxide washing solution.

4. The method of enhancing the electroluminescent performance of fired finely divided copper-activated zinc sulfide electroluminescent phosphor, which method comprises, washing said phosphor in an alkaline sodium cyanide solution for a sufficient period of time to lighten the body color of said phosphor, removing residual washing solution from said phosphor, additionally washing said phosphor in about a 10% by weight aqueous hydrogen peroxide solution for a period of about two hours, and thereafter removing from said phosphor any residual hydrogen peroxide washing solution.

References Cited in the file of this patent

UNITED STATES PATENTS

| 2,743,238 | Hunt et al. | Apr. 24, 1956 |
| 2,950,257 | Froelich | Aug. 23, 1960 |
| 3,031,415 | Morrison et al. | Apr. 24, 1962 |
| 3,076,767 | Faria et al. | Feb. 5, 1963 |
| 3,080,325 | Aven et al. | Mar. 5, 1963 |
| 3,082,344 | Thornton | Mar. 19, 1963 |

FOREIGN PATENTS

| 782,095 | Great Britain | Sept. 4, 1957 |